United States Patent
Chang

(10) Patent No.: US 9,036,733 B2
(45) Date of Patent: May 19, 2015

(54) METHOD OF REDUCING SIGNAL IMBALANCE IN WIRELESS COMMUNICATION SYSTEM

(71) Applicant: Realtek Semiconductor Corp., HsinChu (TW)

(72) Inventor: Yuan-Shuo Chang, Taoyuan County (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 0 days.

(21) Appl. No.: 13/939,171

(22) Filed: Jul. 10, 2013

(65) Prior Publication Data

US 2014/0016690 A1  Jan. 16, 2014

(30) Foreign Application Priority Data

Jul. 12, 2012  (TW) .............................. 101125152 A

(51) Int. Cl.
*H04L 25/03* (2006.01)
*H04L 27/36* (2006.01)
*H04L 27/38* (2006.01)

(52) U.S. Cl.
CPC ........ *H04L 25/03885* (2013.01); *H04L 27/364* (2013.01); *H04L 27/3863* (2013.01)

(58) Field of Classification Search
USPC .................................. 375/295, 296, 260, 285
See application file for complete search history.

(56) References Cited

U.S. PATENT DOCUMENTS

| | | | |
|---|---|---|---|
| 7,830,954 B2 * | 11/2010 | Welz et al. ..................... | 375/219 |
| 7,856,048 B1 * | 12/2010 | Smaini et al. ................. | 375/221 |
| 8,767,869 B2 * | 7/2014 | Rimini et al. ................. | 375/296 |
| 2011/0216858 A1 * | 9/2011 | Zeng ............................ | 375/346 |
| 2014/0018029 A1 * | 1/2014 | Chang et al. .................. | 455/307 |

FOREIGN PATENT DOCUMENTS

| TW | 200618562 | 6/2006 |
|---|---|---|
| TW | 200637261 | 10/2006 |
| TW | 200807995 | 2/2008 |

\* cited by examiner

*Primary Examiner* — Shuwang Liu
*Assistant Examiner* — Ross Varndell
(74) *Attorney, Agent, or Firm* — Winston Hsu; Scott Margo

(57) ABSTRACT

Multiplier coefficients are updated according to minimal power value of mixed signals in a wireless communication system. While using updated multiplier parameters, signal imbalance caused by a local oscillator or mismatch between analog elements of the wireless communication system can be reduced, so that the wireless communication system can be immune from noises.

7 Claims, 14 Drawing Sheets

METHOD OF REDUCING SIGNAL IMBALANCE IN WIRELESS COMMUNICATION SYSTEM

BACKGROUND OF THE INVENTION

1. Field of the Invention

The present invention discloses a method of reducing signal imbalance in a wireless communication system, and more particularly, a method of reducing signal imbalance called I/Q imbalance occurring in a transmitter and a receiver of a wireless communication system by using single-tone signals to generate multiplier coefficients utilized in the wireless communication system and by using multi-tone signals to generate filter coefficients utilized in the wireless communication system.

2. Description of the Prior Art

Please refer to FIG. 1 and FIG. 2, which illustrate a transmitter 110 and a receiver 120 of a conventional communication system. The transmitter 110 includes digital-to-analog converters 112 and 132, low-pass filters 114 and 134, multipliers 116 and 136, a local oscillator 117, an adder 138, a power amplifier 119, and an antenna 118. The receiver 120 includes an antenna 115, a low noise amplifier 149, multipliers 122 and 142, a local oscillator 127, low-pass filters 124 and 144, gain controllers 126 and 146, and analog-to-digital converters 128 and 148. The antenna 115 is configured to receive signals transmitted from the antenna 118. The digital-to-analog converters 112 and 132 respectively receive an in-phase portion I of a signal and a quadrature portion Q. Under an ideal condition, a phase difference between the quadrature portion Q and the in-phase portion I is 90 degrees, i.e., the quadrature portion Q and the in-phase portion I form a pair of mutually-orthogonal signals.

In the transmitter 110 shown in FIG. 1, signals of the local oscillator 117 are mixed into multipliers 116 and 136 to form a primary source of signal imbalance between the quadrature portion Q and the in-phase portion I, i.e. the so-called I/Q imbalance. The I/Q imbalance caused by signals of the local oscillator 117 sabotages the orthogonality between the quadrature portion Q and the in-phase portion I and causes interference between the quadrature portion Q and the in-phase portion I. Besides, in the receiver 120, the I/Q imbalance also occurs between the quadrature portion Q and the in-phase portion I because of signals of the local oscillator 127 mixed into the multipliers 122 and 124, where the I/Q imbalance is irrelevant to frequency.

There is also a frequency-related I/Q imbalance between the transmitter 110 and the receiver 120, where the frequency-related I/Q imbalance is caused by mismatch between analog elements of the transmitter 110 and the receiver 120, and the analog elements may include low-pass filters, analog-to-digital converters, or digital-to-analog converters.

Please refer to FIG. 3, which schematically illustrates the I/Q imbalance occurring in the transmitter 110 shown in FIG. 1 and the receiver 120 shown in FIG. 2. As shown in FIG. 3, if frequencies in the signals outputted from the transmitter 110 are equal to a frequency $f_{RF1}=f_{Lo}+f_{m1}$ and a frequency $f_{RF2}=f_{Lo}+f_{m2}$, where the frequency $f_{Lo}$ is the frequency of the local oscillator, besides the signal portions $S_{m1}$ and $S_{m2}$ respectively having frequencies $f_{RF1}$ and $f_{RF2}$, image portions $I_{m1}$ and $I_{m2}$ respectively having frequencies $(f_{Lo}-f_{m1})$ and $(f_{Lo}-f_{m2})$ as shown in FIG. 3 are also generated because of the I/Q imbalance occurring between the quadrature portion and the in-phase portion in the transmitter 110 and the receiver 120. If the image portions $I_{m1}$ and $I_{m2}$ respectively having frequencies $(f_{Lo}-f_{m1})$ and $(f_{Lo}-f_{m2})$ can be filtered off, i.e. if the orthogonality between the quadrature portion and the in-phase portion of signals can be kept without interfering each other, noises caused by the I/Q imbalance in the transmitter 110 and the receiver 120 can be neutralized.

SUMMARY OF THE INVENTION

The claimed invention discloses a method of reducing signal imbalance at a receiver of a wireless communication system. The method comprises inputting a first single-tone signal having a first frequency and a second single-tone signal having a second frequency to the receiver of the wireless communication, where a difference between the first frequency and a local oscillating frequency is equal to a difference between the local oscillating frequency and the second frequency, and the first frequency is higher than the second frequency; determining a first multiplier coefficient and a second multiplier coefficient according to a first minimal power value of the first single-tone signal generated corresponding to the first single-tone signal at a third frequency, where the third frequency is a negative of the difference between the first frequency and the local oscillating frequency; determining a third multiplier coefficient and a fourth multiplier coefficient according to a first minimal power value of the second single-tone signal generated corresponding to the second single-tone signal at a fourth frequency, where the fourth frequency is a negative of the third frequency; determining a fifth multiplier coefficient according to the second multiplier coefficient and the fourth multiplier coefficient; receiving a multi-tone signal at the receiver of the wireless communication system; and implementing a frequency-domain least mean square algorithm using the fifth multiplier coefficient and a constant multiplier coefficient and according to the multi-tone signal, for updating a set of time-domain coefficients of a first multi-tap finite impulse response filter into a set of time-domain coefficients of a second multi-tap finite impulse response filter.

The claimed invention further discloses a method of reducing signal imbalance in a transmitter of a wireless communication system. The method comprises inputting a first single-tone signal having a first frequency and a second single-tone signal having a second frequency to the transmitter of the wireless communication system, where a sum of the first frequency and the second frequency is zero, and the first frequency is higher than the second frequency; inputting the first single-tone signal to a self-mixer of the transmitter for generating a first mixed signal, and inputting the second single-tone signal to the self-mixer for generating a second mixed signal; determining a first multiplier coefficient and a second multiplier coefficient corresponding to a first minimal power value of the first mixed signal at a third frequency according to the first minimal power value of the first mixed signal, and determining a third multiplier coefficient and a fourth multiplier coefficient corresponding to a second minimal power value of the second mixed signal at a fourth frequency according to the second minimal power value of the second mixed signal, where the third frequency is equal to a double of the first frequency, and the fourth frequency is equal to a double of the second frequency; re-inputting the first single-tone signal to the transmitter, and processing the first single-tone signal at the transmitter using the first multiplier coefficient and the second multiplier coefficient for determining a third minimal power value at a fifth frequency at a receiver of the wireless communication system, and determining a fifth multiplier coefficient and a sixth multiplier coefficient corresponding to the third minimal power value, where the fifth frequency is equal to half of the fourth frequency; the transmitter utilizing a constant multiplier coefficient and a seventh multiplier coefficient, and the receiver utilizing the fifth multiplier coefficient and the sixth multiplier coefficient, where the seventh multiplier coefficient is equal to half of a sum of the second multiplier coefficient and the fourth multiplier coefficient; and inputting a multi-tone signal at the transmitter, and performing a frequency-domain least mean square algorithm according to the multi-tone signal, for updating a plurality of time-domain coefficients of a first multi-tap finite impulse filter into a plurality of time-domain coefficients of a second multi-tap finite impulse filter.

These and other objectives of the present invention will no doubt become obvious to those of ordinary skill in the art after reading the following detailed description of the preferred embodiment that is illustrated in the various figures and drawings.

DETAILED DESCRIPTION

For neutralizing the signal imbalance called the I/Q imbalance as mentioned above, the present invention disclose a method of reducing the I/Q imbalance in the transmitter and the receiver of a wireless communication system. In the disclosed method of reducing the I/Q imbalance, single-tone signals are first inputted into the transmitter or the receiver for testing, so as to determine a set of multiplier coefficients that can be utilized for compensating the I/Q imbalance; at last, the set of multiplier coefficients are utilized in a multiplier, and additional multi-tone signals are inputted for test, so as to generate a set of multiplier coefficients that can be utilized for compensating the I/Q imbalance. With the aid of utilizing the set of multiplier coefficients and the set of multiplier coefficients, the I/Q imbalance between the quadrature portion and the in-phase portion of wireless signals processed by a wireless communication system under a normal operation can be reduced, where the wireless signals are not limited to single-tone signals and multi-tone signals.

Figure 1:
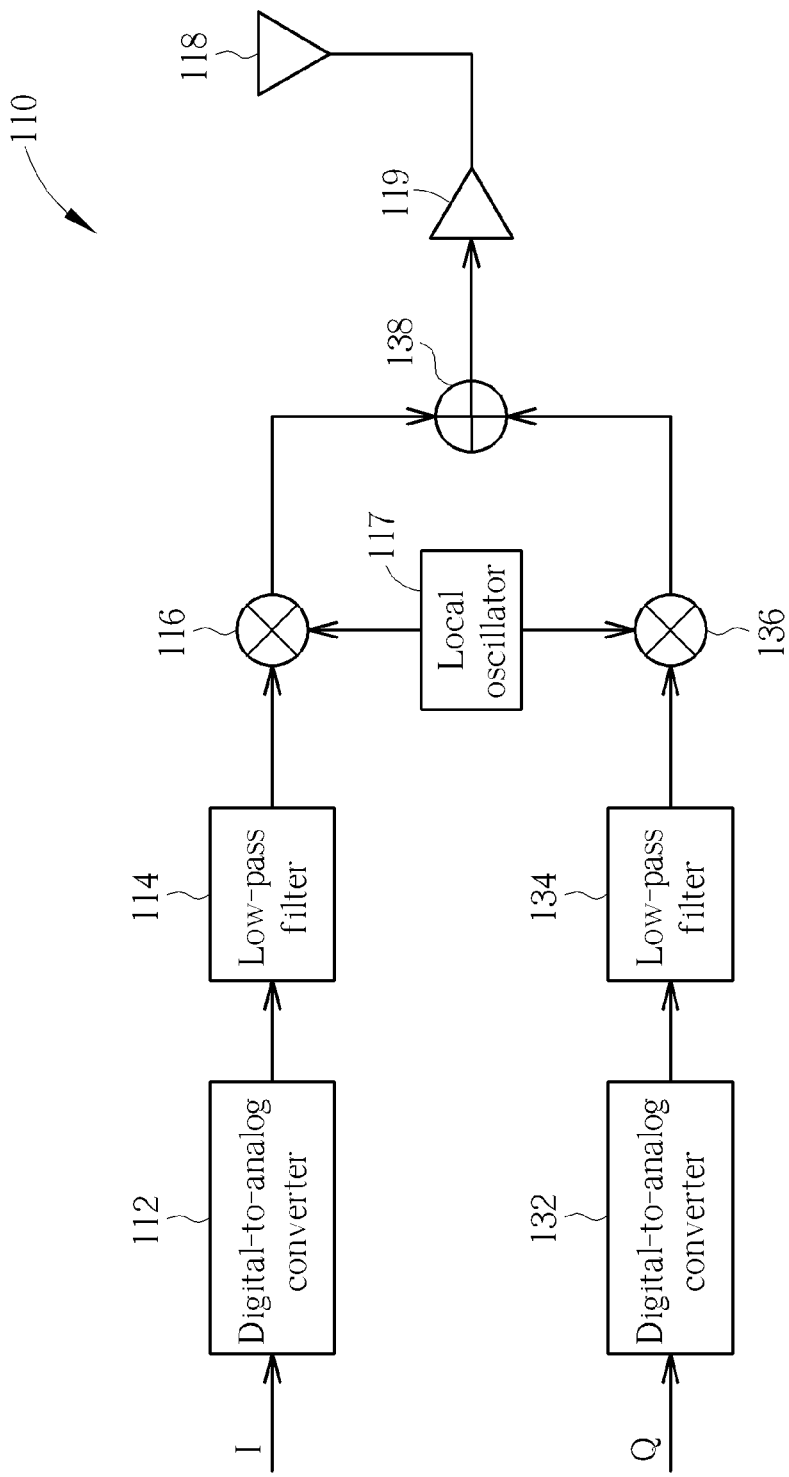
FIG. 1 and FIG. 2 illustrate a transmitter and a receiver of a conventional communication system.
Figure 2:
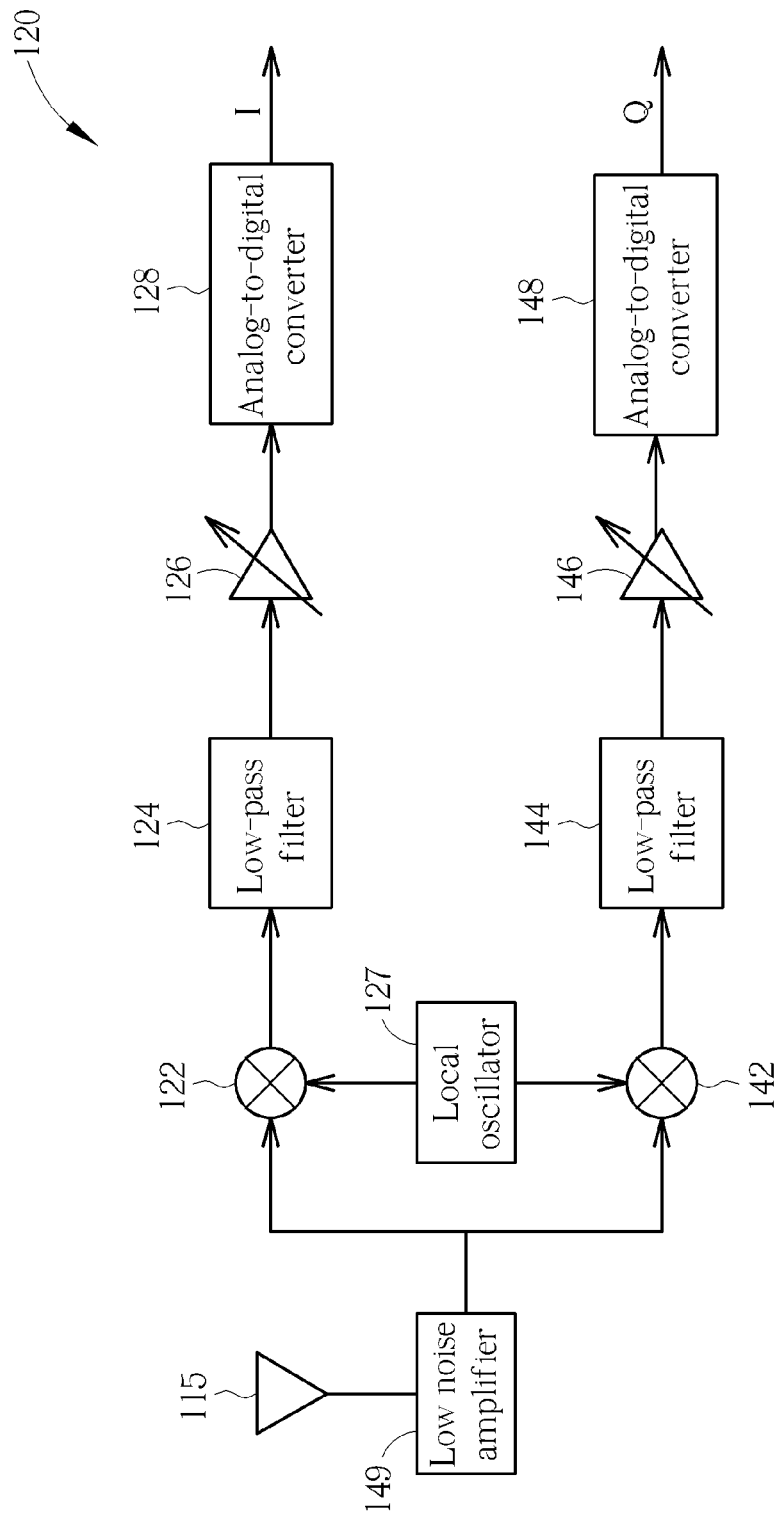
Figure 3:
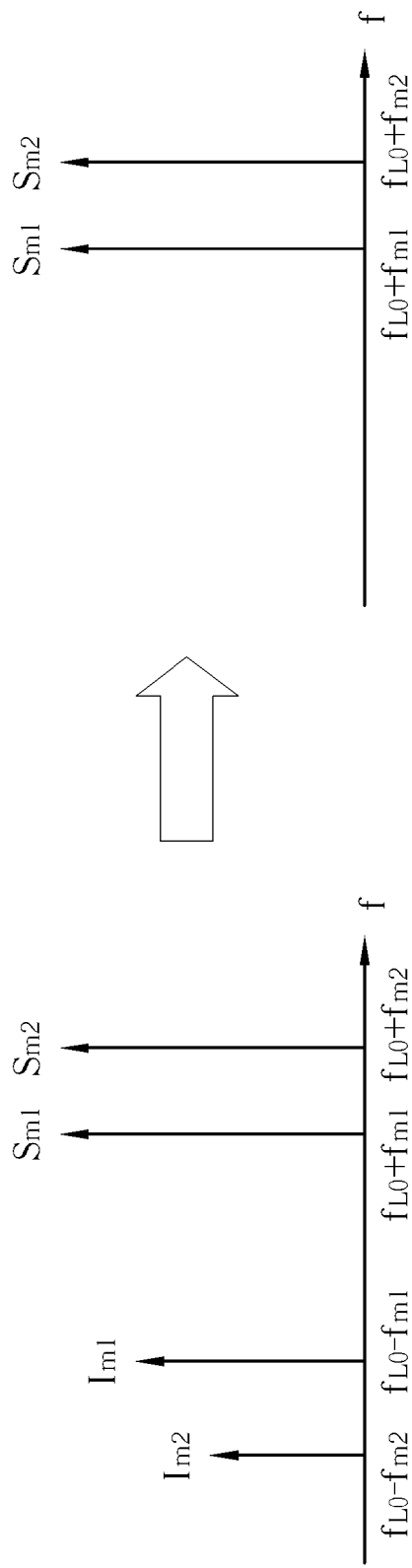
FIG. 3 schematically illustrates the I/Q imbalance occurring in the transmitter shown in FIG. 1 and the receiver shown in FIG. 2.
Figure 4:
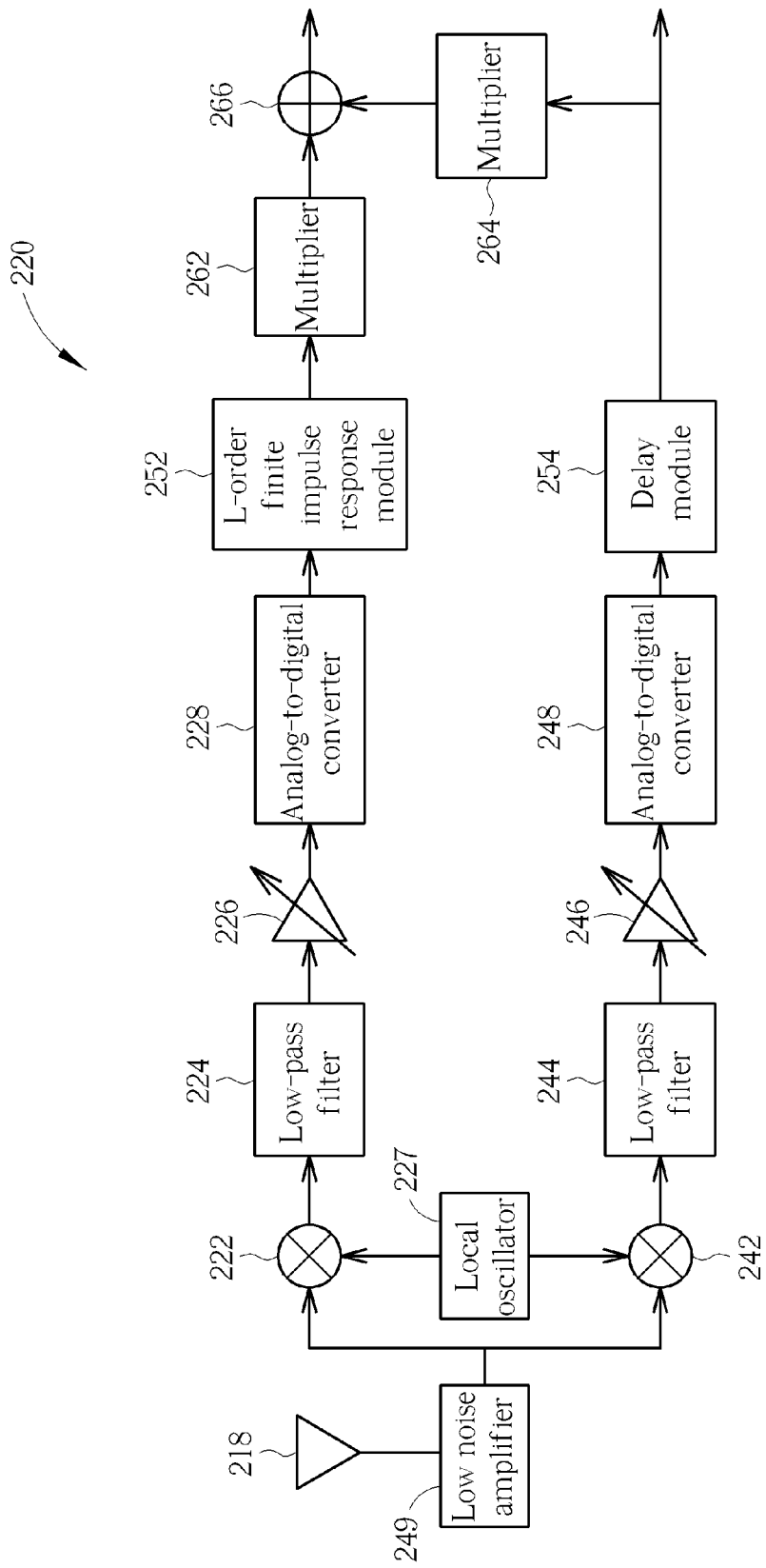
FIG. 4 illustrates a block diagram of a receiver for implementing the method of reducing the I/Q imbalance according to one embodiment of the present invention.

The disclosed method of reducing the I/Q imbalance in the receiver is first described. Please refer to FIG. 4, which illustrates a block diagram of a receiver 220 for implementing the method of reducing the I/Q imbalance according to one embodiment of the present invention. As shown in FIG. 4, the receiver 220 includes an antenna 218, a low-noise amplifier 249, multipliers 222 and 242, a local oscillator 227, low-pass filters 224 and 244, gain controllers 226 and 246, analog-to-digital converters 228 and 248, an L-order finite impulse response module 252 with L being an integer, a delay module 254, multipliers 262 and 264, and an adder 266.

Figure 5:
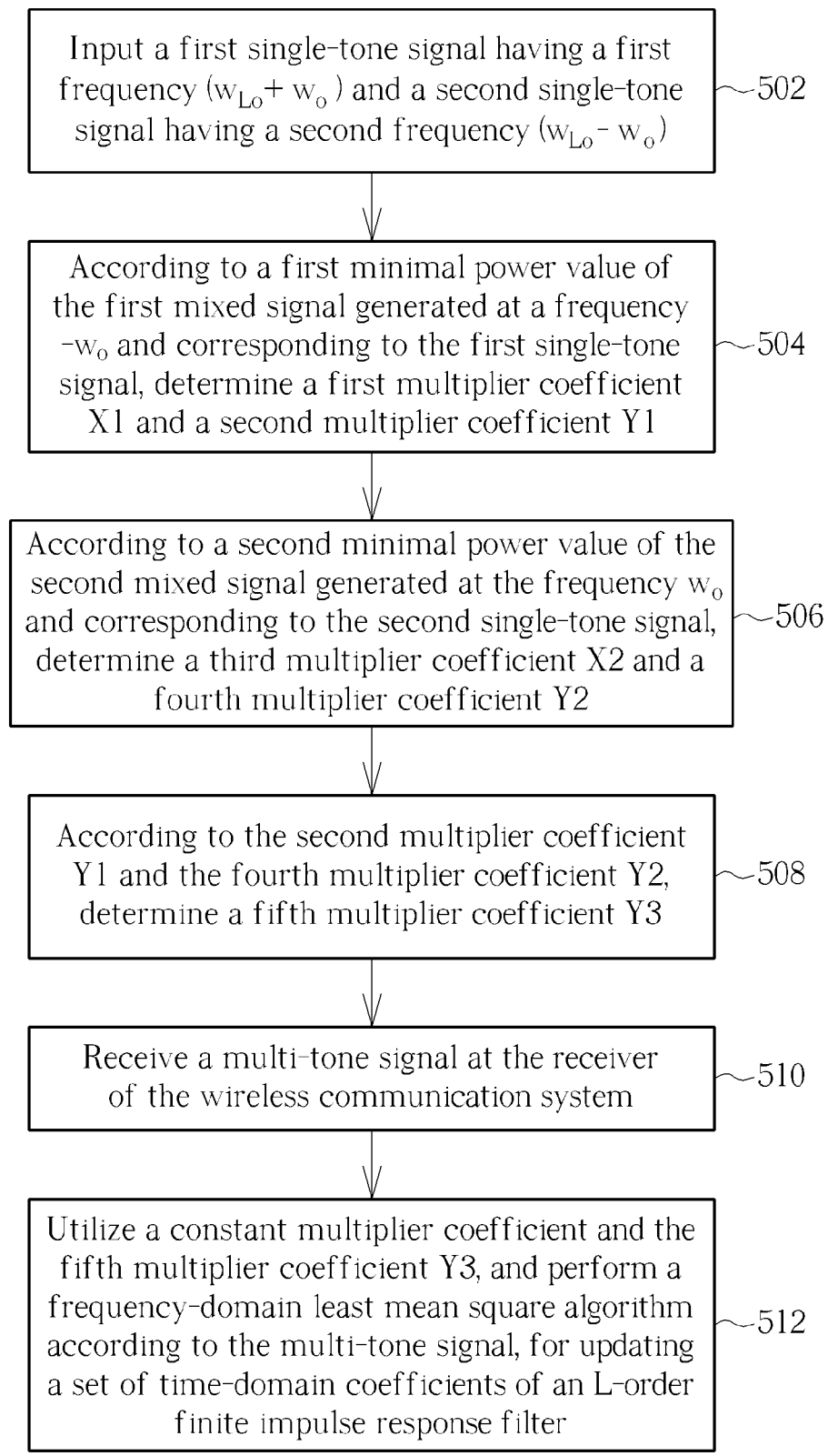
FIG. 5 illustrates a schematic flowchart of the method of reducing I/Q imbalance in the receiver according to one embodiment of the present invention.

Please refer to FIG. 5, which illustrates a schematic flowchart of the method of reducing I/Q imbalance in the receiver according to one embodiment of the present invention. As shown in FIG. 5, the method includes the following steps:

Step 502: Input a first single-tone signal and a second single-tone signal in the receiver 220. The first single-tone signal has a first frequency ($w_{Lo}+w_o$), the second single-tone signal has a second frequency ($w_{Lo}-w_o$), and the frequency $w_{Lo}$ indicates a local oscillating frequency of the local oscillator 227.

Step 504: According to a first minimal power value of the first mixed signal generated at a frequency $-w_o$ and corresponding to the first single-tone signal, determine a first multiplier coefficient X1 and a second multiplier coefficient Y1.

Step 506: According to a second minimal power value of the second mixed signal generated at the frequency $w_o$ and corresponding to the second single-tone signal, determine a third multiplier coefficient X2 and a fourth multiplier coefficient Y2.

Step 508: According to the second multiplier coefficient Y1 and the fourth multiplier coefficient Y2, determine a fifth multiplier coefficient Y3.

Step 510: Receive a multi-tone signal at the receiver of the wireless communication system.

Step 512: Utilize a constant multiplier coefficient on the multiplier 262, utilize the fifth multiplier coefficient Y3 on the multiplier 264, and perform a frequency-domain least mean square algorithm (FLMS algorithm) according to the multi-tone signal, for updating a set of time-domain coefficients of an L-order finite impulse response filter.

Figure 6:
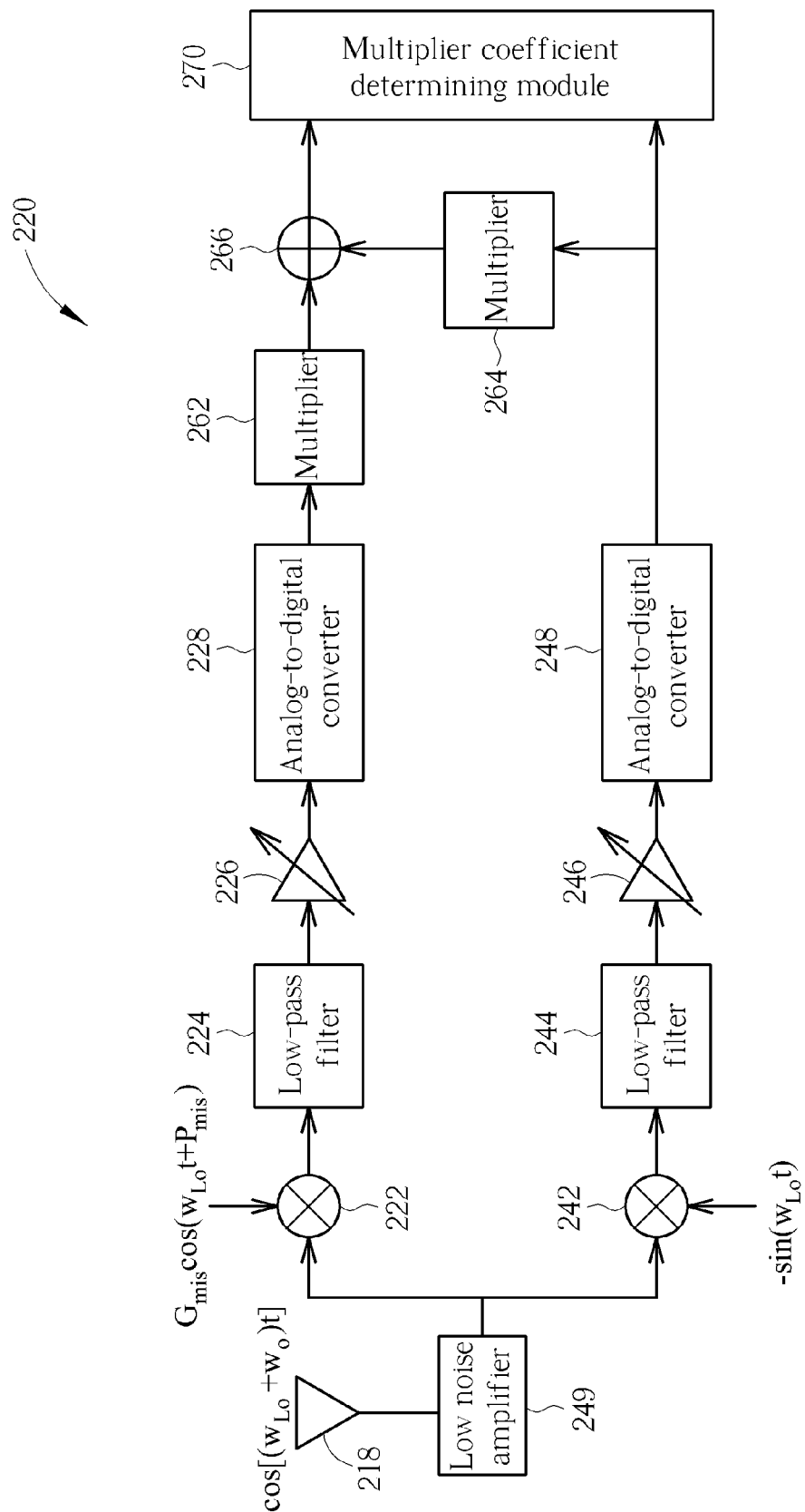
FIG. 6 illustrates a schematic status diagram of the receiver shown in FIG. 4 while performing Step 502, Step 504, and Step 506 shown in FIG. 5.

Please refer to FIG. 6, which illustrates a schematic status diagram of the receiver 220 while performing Step 502, Step 504, and Step 506. In FIG. 6, the frequency responses of the L-order finite impulse response module 252 and the delay module 254 are ignored by being bypassed while performing Step 502, Step 504, and Step 506, for determining multiplier coefficients to be utilized by the multipliers 262 and 264.

As shown in FIG. 6, an in-phase portion $G_{mis}*\cos(w_{Lo}*t+P_{mis})$ of the signals of the local oscillator 227 is mixed with the first single-tone signal at the multiplier 222, where the first single-tone signal is introduced via the antenna 218 and the low-noise amplifier 249, and a value of the first single-tone signal is $\cos[(w_{Lo}+w_o)*t]$. Besides, a quadrature portion $-\sin(w_{Lo}*t)$ of the signals of the local oscillator 227 is also mixed with the first single-tone signal at the multiplier 242. The mixed signal outputted from the multiplier 222 or 242 is processed via the low-pass filter 224 or 244, the gain controller 226 or 246, and the analog-to-digital converter 228 or 248 and reaches a multiplier coefficient determining module 270, so that the multiplier coefficient determining module 270 is configured to determine required multiplier coefficients according to Step 504. Similarly, when the second single-tone signal having a value of $\cos[(w_{Lo}-w_o)*t]$ is inputted to the receiver 220, the multiplier coefficient determining module 270 is also capable of determining required multiplier coefficients according to Step 506.

In Step 504, the multiplier coefficient determining module 270 determines a coefficient, which is utilized by the multiplier 262 under the condition that a minimal power value of the mixed signal generated corresponding to the first single-tone signal occurs at the frequency $-w_o$, to be the first multiplier coefficient X1, and determines a coefficient utilized by the multiplier 264 under the same condition to be the second multiplier coefficient Y1. In one embodiment of the present invention, the value of the second multiplier coefficient Y1 is a negative of a tangent of a phase mismatch P1 between a quadrature portion and an in-phase portion generated at the receiver 220 corresponding to the first single-tone signal, i.e., $-\tan(P1)$. The phase difference between the quadrature portion and the in-phase portion generated at the receiver corresponding to the first single-tone signal is supposed to be 90 degrees, however, under a phase mismatch between the quadrature portion and the in-phase portion, the phase difference between the quadrature portion and the in-phase portion is deviated to be (90°+P1). The reason of taking multiplier coefficients while a minimal power value occurring at the frequency value $-w_o$ lies in the fact that a power level of the mixed signal occurring at the frequency $-w_o$ indicates a degree of deviation from orthogonality (i.e. deviation from 90 degrees) between the quadrature portion and the in-phase portion corresponding to the first single-tone signal having the frequency $w_o$, and the fact that the abovementioned minimal power value of the first mixed signal indicates a minimum of the deviation from orthogonality between the quadrature portion and the in-phase portion.

Similarly, in Step 506, the multiplier coefficient determining module 270 determines the coefficient, which is utilized by the multiplier 262 under the condition that a minimal power value of the second mixed signal generated corresponding to the second single-tone signal occurs at the frequency $w_o$, to be the third multiplier coefficient X2, and determines the coefficient utilized by the multiplier 264 under the same condition to be the fourth multiplier coefficient Y2. In one embodiment of the present invention, a value of the fourth multiplier coefficient Y2 is a negative of a tangent of a phase mismatch P2 between the quadrature portion and the in-phase portion corresponding to the second single-tone signal and generated on the receiver 220, i.e., $-\tan(P2)$. The phase difference between the quadrature portion and the in-phase portion generated at the receiver 220 and corresponding to the second single-tone signal is supposed to be 90 degrees, however, under a phase mismatch between the quadrature portion and the in-phase portion, the phase difference between the quadrature portion and the in-phase portion is deviated to be (90°+P2).

Step 508, Step 510, and Step 512 are primarily configured to perform tests utilizing the multiplier coefficients determined in Step 502, Step 504, and Step 506, where the tests may be performed in a recursive manner so that last-determined time-domain filter coefficients may be utilized for reducing the I/Q imbalance. Please refer to FIG. 7, which illustrates a status diagram of the receiver 220 while performing Step 508, Step 510, and Step 512. A frequency-domain least mean square module 280 is additionally utilized for performing the frequency-domain least mean square algorithm mentioned in Step 512.

In Step 508, multiplier coefficients cooperating with multi-tone signals have to be determined in advance. In one embodiment of the present invention, a constant multiplier coefficient is utilized by the multiplier 262, for example, a constant multiplier coefficient of a value 1, and a fifth multiplier coefficient Y3 is utilized by the multiplier 264, where the fifth multiplier coefficient Y3 is equal to half of a sum of the second multiplier coefficient Y1 and the fourth multiplier coefficient Y2.

Figure 7:
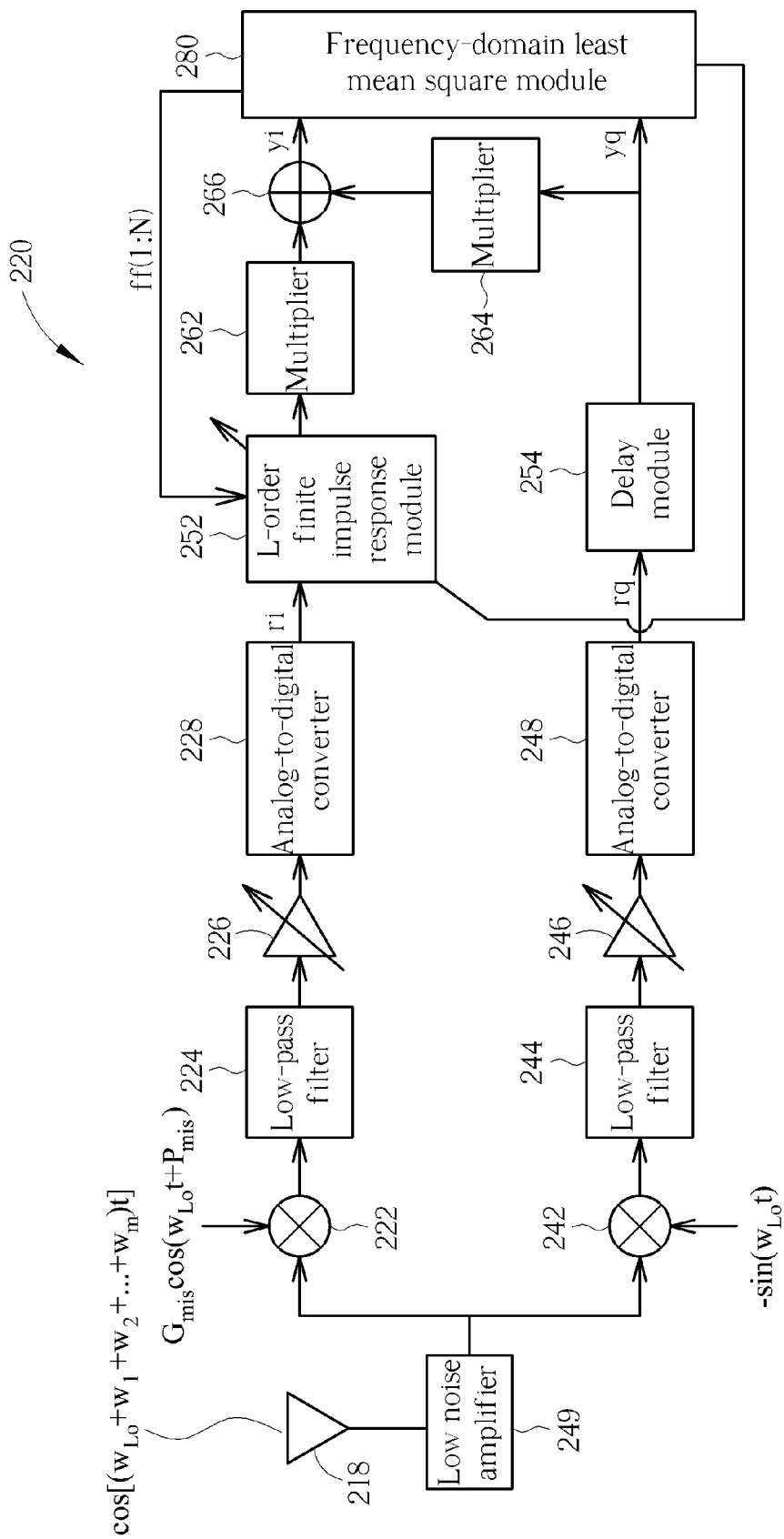
FIG. 7 illustrates a status diagram of the receiver shown in FIG. 4 while performing Step 508, Step 510, and Step 512 shown in FIG. 5.

In Step 510, as shown in FIG. 7, an in-phase portion $G_{mis}*\cos(w_{Lo}*t+P_{mis})$ of the signal of the local oscillator 227 is mixed with a multi-tone signal having a value $\cos[(w_{Lo}+w_1+w_2+\ldots w_m)*t]$ at the multiplier 222, where the multi-tone signal is introduced via the antenna 218 and the low-noise amplifier 249, and $w_{Lo}, w_1, w_2, \ldots, w_m$ indicate different frequencies; besides, the quadrature portion $-\sin(w_{Lo}*t)$ of the signal of the local oscillator 227 is also mixed with the multi-tone signal at the multiplier 242. The mixed signal outputted from the multiplier 222 or 242 is processed via the low-pass filter 224 or 244, the gain controller 226 or 246, the analog-to-digital converter 228 or 248, and the L-order finite impulse response module 252 or the delay module 254 and reaches the multiplier 262 or 264.

Before the mixed signal reaches the L-order finite impulse response module 252 or the delay module 254, an intermediate signal ri located at an input terminal of the L-order finite impulse response module 252 and an intermediate signal rq located at an input terminal of the delay module 254 are formed, and the intermediate signal ri will be referenced by the frequency-domain least mean square module 280 in Step 512. After the mixed signal is processed by the multiplier 262 utilizing the constant multiplier coefficient or by the multiplier 264 utilizing the fifth multiplier coefficient 264, an in-phase time-domain signal yi is formed at the adder 266 by adding outputs of the multipliers 262 and 264, and a quadrature time-domain signal yq is formed as an output of the delay module 254.

Figure 8:
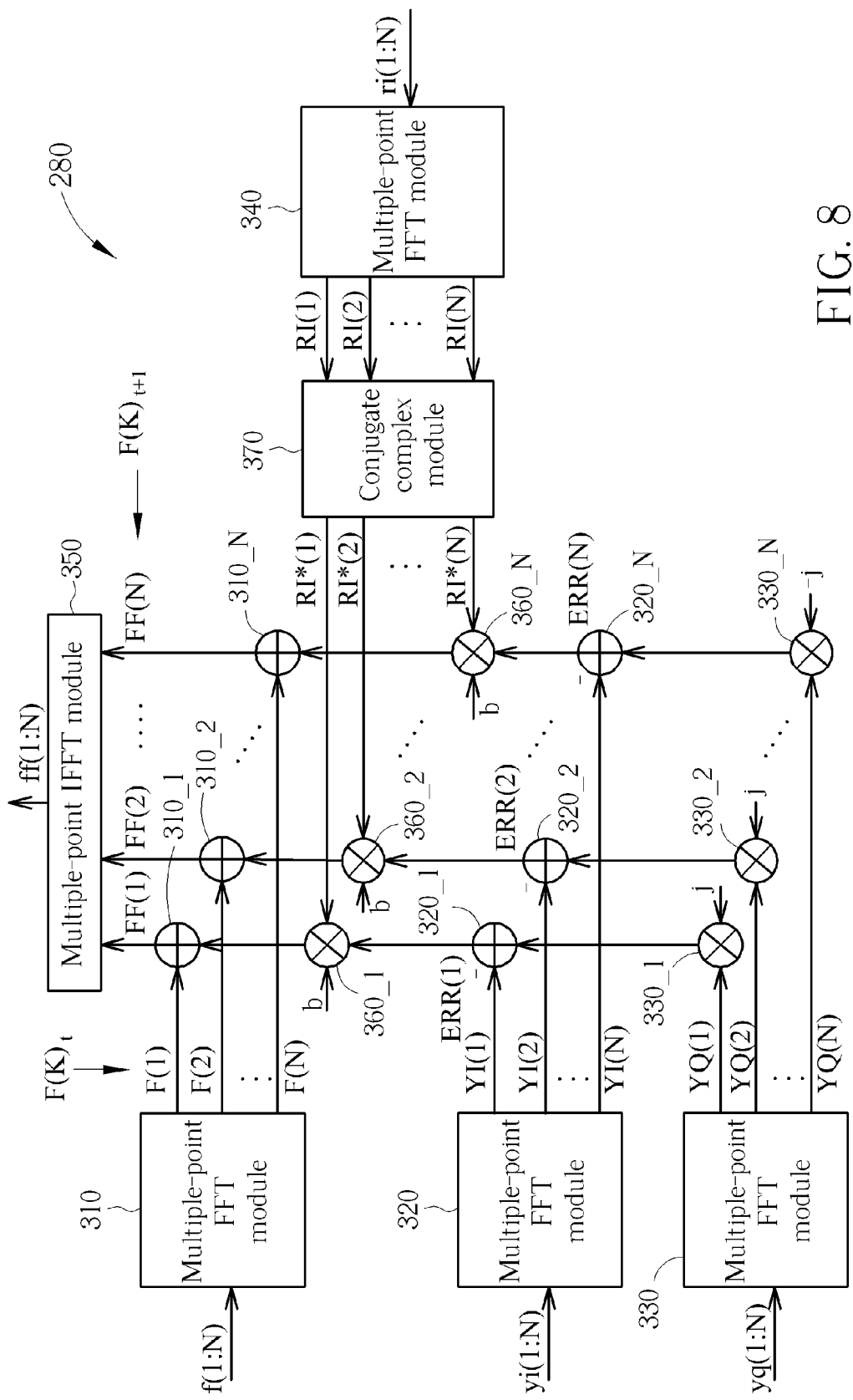
FIG. 8 illustrates a block diagram of the frequency-domain least mean square module shown in FIG. 7 according to one embodiment of the present invention.

Please refer to FIG. 8, which illustrates a block diagram of the frequency-domain least mean square module 280 shown in FIG. 7 according to one embodiment of the present invention, where the frequency-domain least mean square module 280 is utilized for supporting Step 512. As shown in FIG. 8, the frequency-domain least mean square module 280 includes multiple-point Fast Fourier Transform (FFT) modules 310, 320, 330, and 340, a multiple-point inverse FFT (IFFT) module 350, a conjugate complex module 370, N multipliers 330_1, 330_2, ..., 330_N, N adders 320_1, 320_2, ..., 320_N, N multipliers 360_1, 360_2, ..., 360_N, and N adders 310_1, 310_2, ..., 310_N, whereby N indicates a positive integer.

Operations of the frequency least mean square module 280 are performed by sampling each inputted multi-tone signal by multiple times (e.g. N times with N being a positive integer). A set of N first L-order finite impulse response time-domain coefficients f(1:N) utilized by the L-order finite impulse response module 252, N in-phase time-domain signals yi(1:N), N quadrature time-domain signals yq(1:N), and N intermediate signals ri(1:N) are required for generating a set of N second L-order finite impulse response time-domain coefficients ff(1:N), and the set of N second L-order finite impulse response time-domain coefficients ff(1:N) are returned to the L-order finite impulse response module 252 for updating, for the purpose of aiding reducing the I/Q imbalance within other types of signals to be processed. The N in-phase time-domain signals yi(1:N), the N quadrature time-domain signals yq(1:N), and N intermediate signals ri(1:N) are the results of sampling at the receiver 220 by N times.

The N first L-order finite impulse response time-domain coefficients f(1:N) are transformed into N first L-order finite impulse response frequency-domain coefficients F(1), F(2), ..., F(N) by the multiple-point FFT module 310. The N in-phase time-domain signals yi(1:N) is transformed into N in-phase frequency-domain signals YI(1), YI(2), ..., YI(N) by the multiple-point FFT module 320. The N quadrature time-domain signals yq(1:N) is transformed into N quadrature frequency-domain signals YQ(1), YQ(2), ..., YQ(N) by the multiple-point FFT module 330. The N intermediate signals ri(1:N) are transformed into N intermediate frequency-domain signals RI(1), RI(2), ..., RI(N) by the multiple-point FFT module 340. The N intermediate frequency-domain signals RI(1), RI(2), ..., RI(N) are then processed by the conjugate complex module 370 to generate N intermediate frequency-domain conjugate complex signals RI*(1), RI*(2), ..., RI*(N).

N error frequency-domain signals ERR(1), ERR(2), ..., ERR(N) are generated at output terminals of the adders 320_1, 320_2, ..., 320_N, where the rules of generating the N error frequency-domain signals ERR(1), ERR(2), ..., ERR(N) are listed as the following equations:

$$ERR(K)=YQ(K) \cdot j - YI(k), 0 \leq K < N/2 \quad (2)$$

$$ERR(K)=YQ(K) \cdot (-j) - YI(k), N/2+1 \leq K < N-1 \quad (2)$$

The imaginary numbers j or (−j) mentioned in Equation (1) or Equation (2) are inputted from the multipliers 330_1, 330_2, ..., 330_N, where half of the multipliers 330_1, 330_2, ..., 330_N are configured to receive the imaginary number j, and the other half of the multipliers 330_1, 330_2, ..., 330_N are configured to receive the imaginary number (−j).

The N first L-order finite impulse response frequency-domain coefficients F(1), F(2), ..., F(N) are adjusted to generated N second L-order finite impulse response frequency-domain coefficients FF(1), FF(2), ..., FF(N) according to the abovementioned error frequency-domain signals ERR(1), ERR(2), ..., ERR(N), the N intermediate frequency-domain conjugate complex signals RI*(1), RI*(2), ..., RI*(N), and a step value b. The rule for generating the N second L-order finite impulse response frequency-domain coefficients FF(1), FF(2), ..., FF(N) is listed as the following equation:

$$F(K)_{t+1} = F(K)_t + b \cdot ERR(K) \cdot RI^*(K) \quad (3)$$

In Equation (3), $F(K)_t$ indicates a first L-order finite impulse response frequency-domain coefficient, $F(K)_{t+1}$ indicates a second L-order finite impulse response frequency-domain coefficient corresponding to the first L-order finite impulse response frequency-domain coefficient. For example, when the first L-order finite impulse response frequency-domain coefficient $F(K)_t$ is F(3), the second L-order finite impulse response frequency-domain coefficient $F(K)_{t+1}$ is FF(3), and etc. The step value b is inputted into the N multipliers 360_1, 360_2, ..., 360_N.

At last, the multiple-point IFFT module 350 transforms the N second L-order finite impulse response frequency-domain coefficients FF(1), FF(2), ..., FF(N) back to the time domain for generating N second L-order finite impulse response time-domain coefficients ff(1:N), which are then returned to the L-order finite impulse module 252 for replacing the previously-utilized L-order finite impulse response time-domain coefficients f(1:N). When the L-order finite impulse module 252 utilizes the N second L-order finite impulse response time-domain coefficients ff(1:N), the I/Q imbalance in the signals can be significantly reduced in comparison to the condition that the L-order finite impulse module 252 utilizes the N first L-order finite impulse response time-domain coefficients f(1:N).

Figure 9:
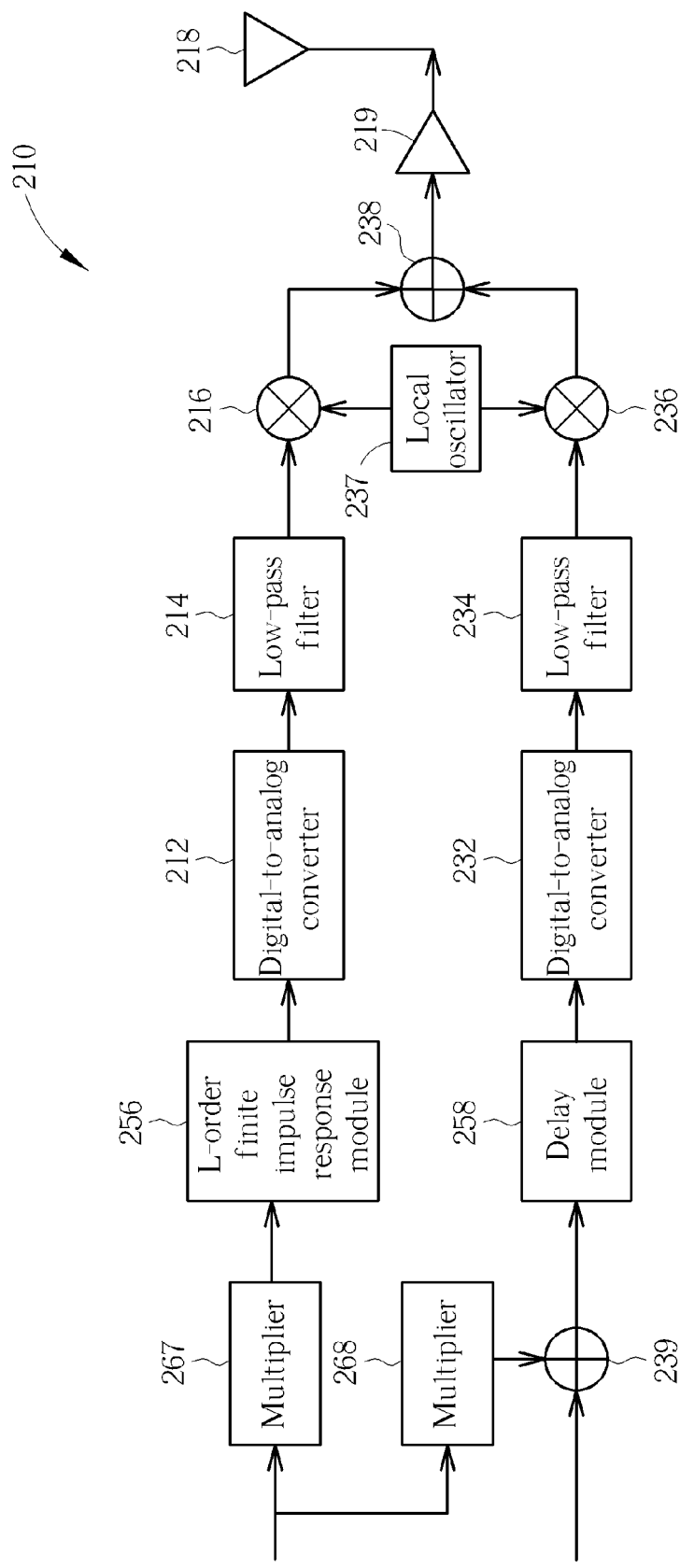
FIG. 9 illustrates a block diagram of a transmitter utilized for implementing the disclosed method of reducing the I/Q imbalance according to one embodiment of the present invention.

The method of reducing the I/Q imbalance in the transmitter in the present invention is described as the following description. Please refer to FIG. 9, which illustrates a block diagram of a transmitter 210 utilized for implementing the disclosed method of reducing the I/Q imbalance according to one embodiment of the present invention. As shown in FIG. 9, the transmitter 210 includes adders 238 and 239, multipliers 267 and 268, digital-to-analog converters 212 and 232, low-pass filters 214 and 234, multipliers 216 and 236, a local oscillator 237, a power amplifier 219, an antenna 218, an L-order finite impulse response module 256, and a delay module 258.

Figure 10:
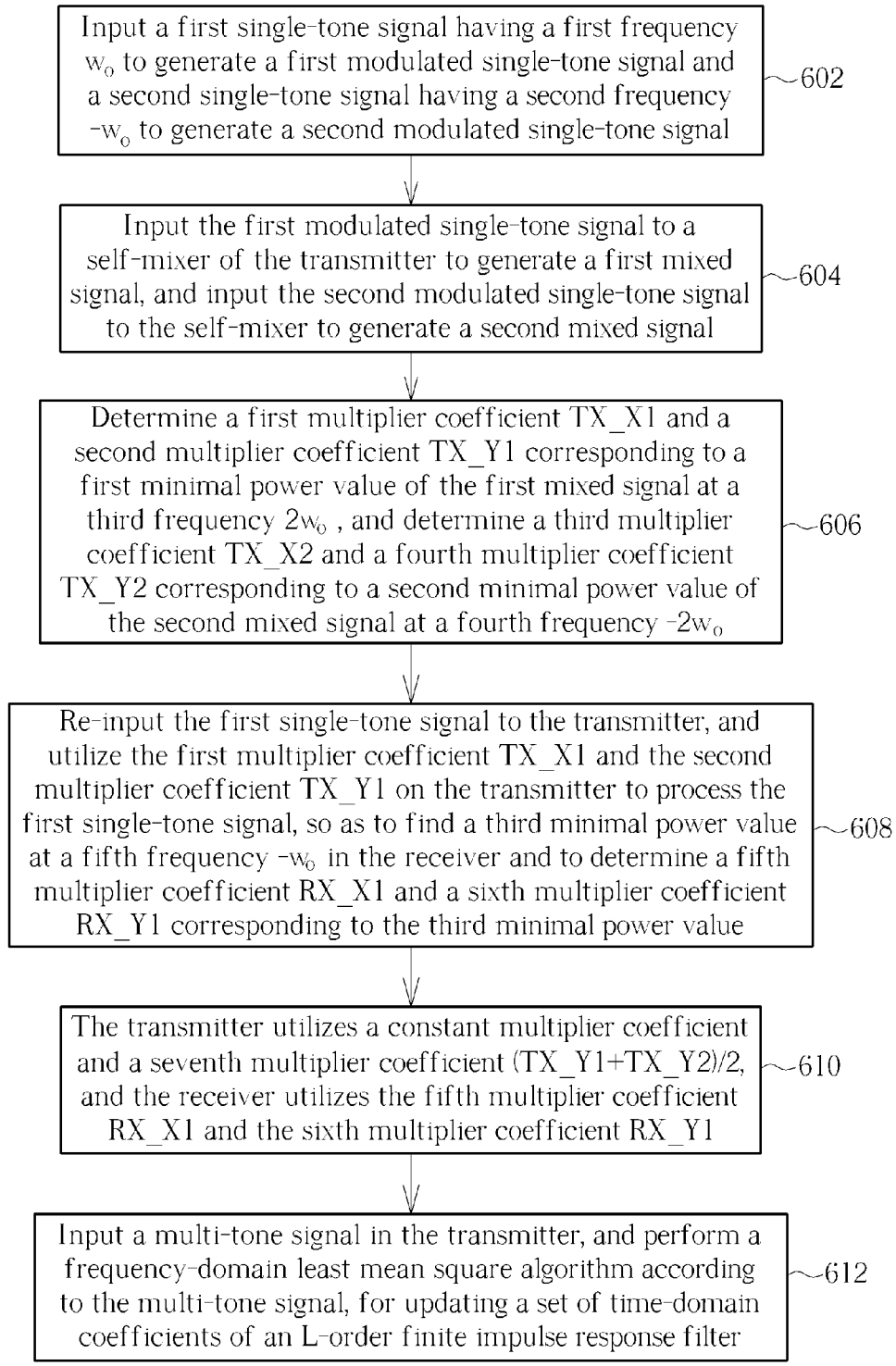
FIG. 10 schematically illustrates a flowchart of the disclosed method of reducing the I/Q imbalance in the transmitter shown in FIG. 9 according to one embodiment of the present invention.

Please refer to FIG. 10, which schematically illustrates a flowchart of the disclosed method of reducing the I/Q imbalance in the transmitter according to one embodiment of the present invention. As shown in FIG. 10, the method includes the following steps:

Step 602: Input a first single-tone signal to generate a first modulated single-tone signal and input a second single-tone signal to the transmitter 210 to generate a second modulated single-tone signal, where the first single-tone signal has a first frequency $w_o$, the second single-tone signal has a second frequency $-w_o$, the first modulated single-tone signal has a first modulated frequency $(w_{Lo}+w_o)$, and the second modulated single-tone signal has a second modulated frequency $(w_{Lo}-w_o)$.

Step 604: Input the first modulated single-tone signal to a self-mixer of the transmitter to generate a first mixed signal, and input the second modulated single-tone signal to the self-mixer to generate a second mixed signal.

Step 606: Determine a first multiplier coefficient TX_X1 and a second multiplier coefficient TX_Y1 corresponding to a first minimal power value of the first mixed signal at a third frequency $2w_o$ according to the first minimal power value, and determine a third multiplier coefficient TX_X2 and a fourth multiplier coefficient TX_Y2 corresponding to a second minimal power value of the second mixed signal at a fourth frequency $-2w_o$ according to the second minimal power value.

Step 608: Re-input the first single-tone signal to the transmitter 210, and utilize the first multiplier coefficient TX_X1 and the second multiplier coefficient TX_Y1 on the transmitter 210 to process the first single-tone signal, so as to find a third minimal power value at a fifth frequency $-w_o$ in the receiver and to determine a fifth multiplier coefficient RX_X1 and a sixth multiplier coefficient RX_Y1 corresponding to the third minimal power value.

Step 610: The transmitter 210 utilizes a constant multiplier coefficient and a seventh multiplier coefficient (TX_Y1+TX_Y2)/2, and the receiver 220 utilizes the fifth multiplier coefficient RX_X1 and the sixth multiplier coefficient RX_Y1.

Step 612: Input a multi-tone signal in the transmitter 210, and performing a frequency-domain least mean square algorithm according to the multi-tone signal, for updating a set of time-domain coefficients of an L-order finite impulse response filter.

Figure 11:
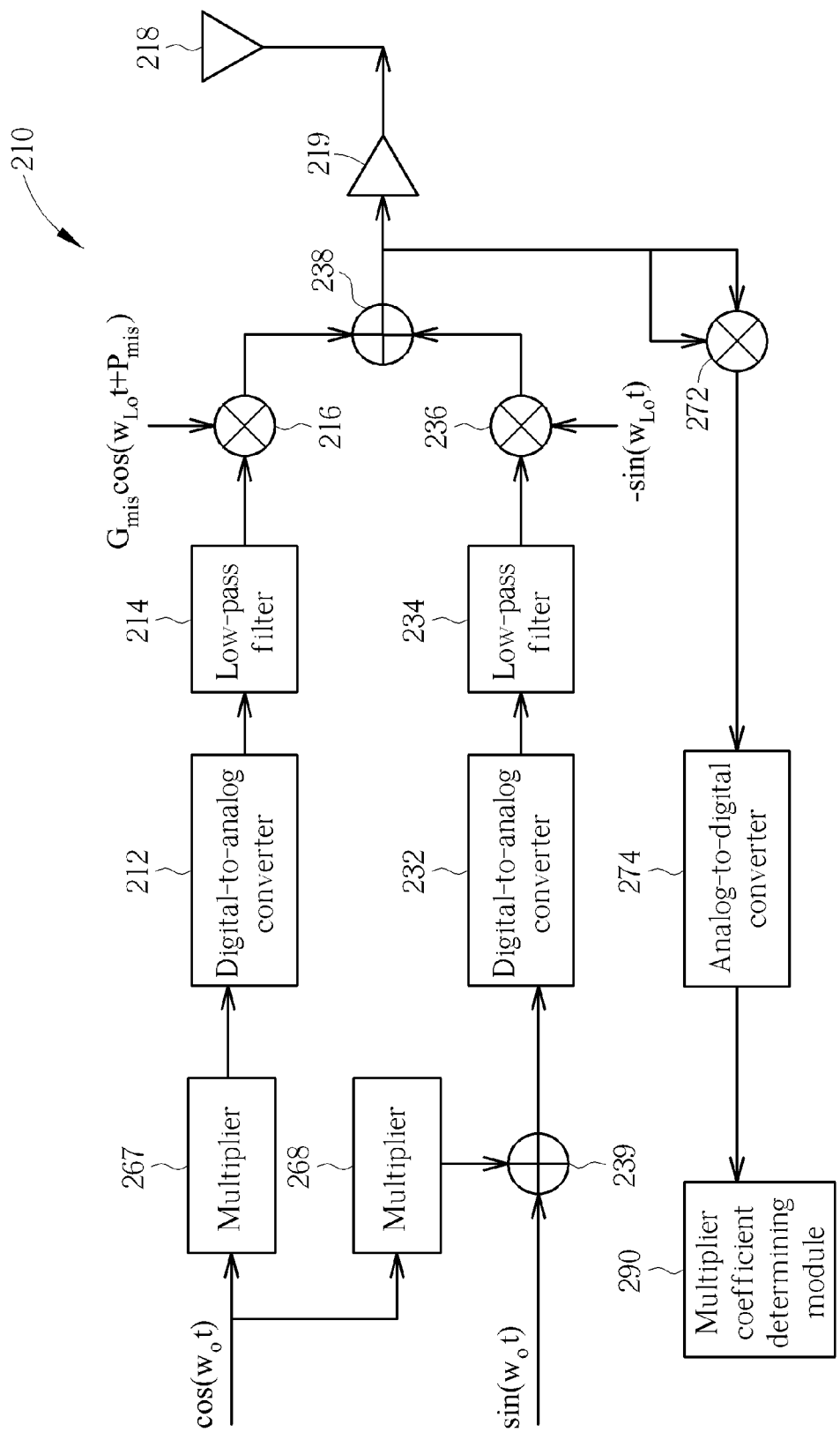
FIG. 11 illustrates a status diagram of the transmitter shown in FIG. 9 while performing the Step 602, Step 604, and Step 606 shown in FIG. 10.

Please refer to FIG. 11, which illustrates a status diagram of the transmitter 210 while performing the Step 602, Step 604, and Step 606, where frequency responses of the L-order finite impulse response module 256 and the delay module 258 are ignored because of being bypassed while performing Step 602, Step 604, and Step 606. A self-mixer 272, an analog-to-digital converter 274, and a multiplier coefficient determining module 290 are further utilized in FIG. 11. The multiplier coefficient determining module 290 is configured to determine multiplier coefficients to be utilized by the multipliers 267 and 268.

According to Step 602 and as shown in FIG. 11, an in-phase portion $G_{mis}*\cos(w_{Lo}*t+P_{mis})$ of signals of the local oscillator 237 are mixed with the in-phase portion of the first single-tone signal at the multiplier 216, where the in-phase portion of the first single-ton signal is introduced via the multiplier 267, the digital-to-analog converter 212, and the low-pass filter 214, and said in-phase portion of the first single-tone signal has a value of $\cos(w_o*t)$. Besides, the quadrature portion $-\sin(w_{Lo}*t)$ of the signals of the local oscillator 237 are mixed with the quadrature signal of the first single-tone signal at the multiplier 236, where the quadrature portion of the first single-tone signal is introduced via the adder 239, the digital-to-analog converter 232, and the low-pass filter 234, and the quadrature signal of the first single-tone signal has a value of $\sin(w_o*t)$. The modulated single-tone signal outputted from the adder 238, which is generated by adding the outputs of the multipliers 216 and 236 at the adder 238, is directed to a feedback path formed by the multiplier 272 and the analog-to-digital converter 274 to generate a first mixed signal; after the first mixed signal reaches the multiplier coefficient determining module 290, the multiplier coefficient determining module 290 is capable of determining multiplier coefficients to be utilized by the multipliers 267 and 268 as a next step according to Step 606. Similarly, according to Step 604, a second single-tone signal having an in-phase portion $\cos(-w_o*t)$ and a quadrature portion $\sin(-w_o*t)$ may also be inputted for generating a second mixed signal at the self-mixer 272, and the multiplier coefficient determining module 290 is configured to determine and update the multiplier coefficients to be utilized by the multipliers 267 and 268 as a next step according to Sep 606.

In Step 606, the multiplier coefficient determining module 290 is configured to determine coefficients utilized by the multiplier 267 when a minimal power value of the mixed signal generated corresponding to the first single-tone signal occurs at the frequency $2w_o$ to be the first multiplier coefficient TX_X1, and to determine coefficient utilized by the multiplier 268 at the same time as the second multiplier coefficient TX_Y1. Similar with the receiver case mentioned before, the reason why taking the utilized multiplier coefficients when the minimal power value occurs at the frequency $2w_o$ lies in the fact that a power value of the first mixed signal at the frequency $2w_o$ indicates a degree of deviation from orthogonality between the quadrature portion and the in-phase portion of the first single-tone signal having the frequency $w_o$, and the fact that a minimum of said power value of the mixed signal indicates a minimal degree of the deviation from the orthogonality. In one embodiment of the present invention, the value of the second multiplier coefficient T_Y1 is a negative of a tangent of a phase mismatch P1 between the in-phase portion and the quadrature portion generated at the transmitter 210 corresponding to the first single-tone signal, i.e., $-\tan(P1)$.

Similarly, in Step 606, the multiplier coefficient determining module 290 is configured to determine coefficients utilized by the multiplier 267 when a minimal power value of the second mixed signal generated corresponding to the second single-tone signal occurs at the frequency $-2w_o$ to be a third multiplier coefficient TX_X2, and to determine coefficients utilized by the multiplier 268 at the same time to be the fourth multiplier coefficient TX_Y2. In one embodiment of the present invention, a value of the fourth multiplier coefficient TX_Y2 is a negative of a tangent of a phase mismatch P2 between the quadrature portion and the in-phase portion generated at the transmitter 210 corresponding to the second single-tone signal, i.e., $-\tan(P2)$.

In Step 602, 604, and 606, I/Q imbalance from the receiver 220 are isolated so that the multiplier coefficients determined at Step 606 and by the transmitter 210 are isolated from effects of frequency-dependent and frequency-independent I/Q imbalance occurred in the transmitter 210.

Figure 12:
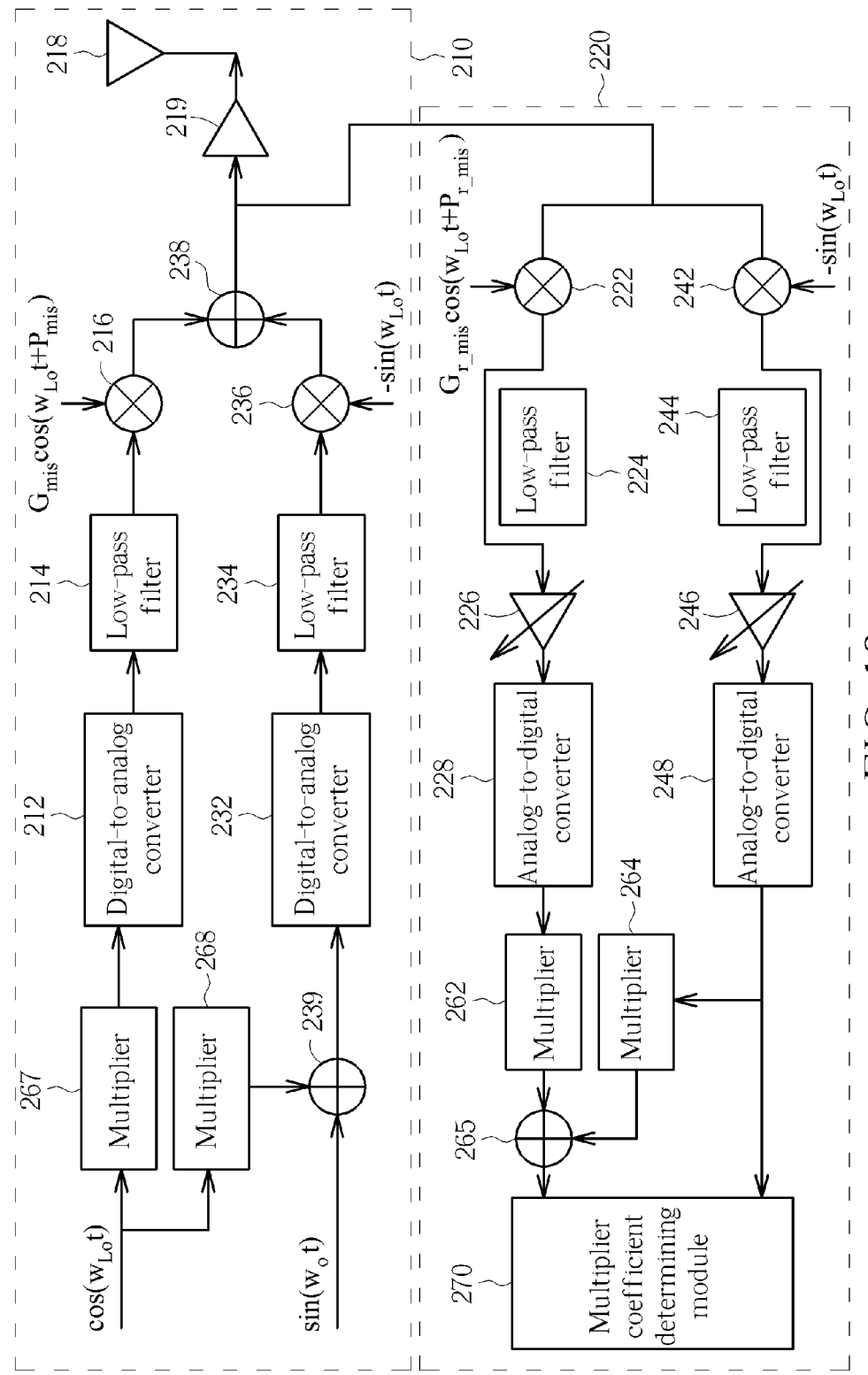
FIG. 12 illustrates a state diagram of the transmitter shown in FIG. 9 while performing Step 608 shown in FIG. 10.

Please refer to FIG. 12, which illustrates a state diagram of the transmitter 210 while performing Step 608, where signal responses of the L-order finite impulse response module 256 and the delay module 258 are ignored because of being bypassed while performing Step 608. A signal response of the receiver 220 is additionally considered in FIG. 12 so that the multiplier coefficient determining module 270 is configured to determine multiplier coefficients to be utilized by the multipliers 262 and 264 as a next step at the receiver 220, i.e., the I/Q imbalance from the receiver 220 is further considered from determining the multiplier coefficients to be utilized in the receiver 220 based on the multiplier coefficients to be utilized in the transmitter 210 and determined in Step 606. At this time, in the receiver 220, the signal responses of the L-order finite impulse response module 252, the delay module 254, and the low-pass filters 224 and 244 are ignored because of being bypassed while performing Step 608.

A primary purpose of Step 608 is to find multiplier coefficients to be utilized in the receiver based on the found multiplier coefficients in Step 606, which are isolated from the effects of the I/Q imbalance from the receiver 220, are corresponding weakest I/Q imbalance. Because of the isolation of the determined multiplier coefficients of the transmitter 210 from the effects of the I/Q imbalance from the receiver 220, the multiplier coefficients determined in Step 608 may also be immune from frequency-dependent I/Q imbalance of the receiver 220. Since the first single-tone signal having the frequency $w_o$ is inputted again at the transmitter 210, whether the minimal power value can be found at the frequency $-w_o$ is the key to suppress the frequency-related I/Q imbalance at the receiver 220 to its minimal degree. After finding the minimal power value at the frequency $-w_o$, which is produced due to the I/Q imbalance at the added receiver 220 in FIG. 12, and corresponding to the first single-tone signal, the multiplier coefficient determining module 270 is configured to determine a multiplier coefficient currently-utilized by the multiplier 262 to be a fifth multiplier coefficient RX_X1, and to determine a multiplier coefficient currently-utilized by the multiplier 264 to be a sixth multiplier coefficient RX_Y1. In one embodiment of the present invention, a value of the sixth multiplier coefficient RX_Y1 is a negative of a tangent of a phase mismatch between the quadrature portion and the in-phase portion generated at the receiver 220 and corresponding to the first single-tone signal, i.e., $-\tan(P3)$.

In Step 610 and Step 612, the multiplier coefficients determined in Step 602, Step 604, Step 606, and Step 608 are tested in cooperation with a multi-tone signal, for updating a set of L-order finite impulse response time-domain coefficients, and for utilizing the set of L-order finite impulse response time-domain coefficients to compensate frequency-related and frequency-irrelevant I/Q imbalance. Please refer to FIG. 13, which illustrates a state diagram of the receiver 220 while performing Step 610 and Step 612. A frequency-domain least mean square module 280 is further utilized in FIG. 13 for performing the frequency-domain least mean square algorithm mentioned in Step 612.

In Step 610, multiplier coefficients in cooperation with the multi-tone signal are determined in advance. In one embodiment of the present invention, at this time, the multiplier 267 utilizes a constant multiplier coefficient, for example, a constant of value 1, and the multiplier 268 utilizes half of a sum of the second multiplier coefficient TX_Y1 and the fourth multiplier coefficient TX_Y2 as the seventh multiplier coefficient, i.e., (TX_Y1+TX_Y2)/2. Besides, at the same time, the multiplier 262 utilizes the fifth multiplier coefficient RX_X1 determined in Step 608, and the multiplier 264 utilizes the sixth multiplier coefficient RX_Y1 determined in Step 608.

Figure 13:
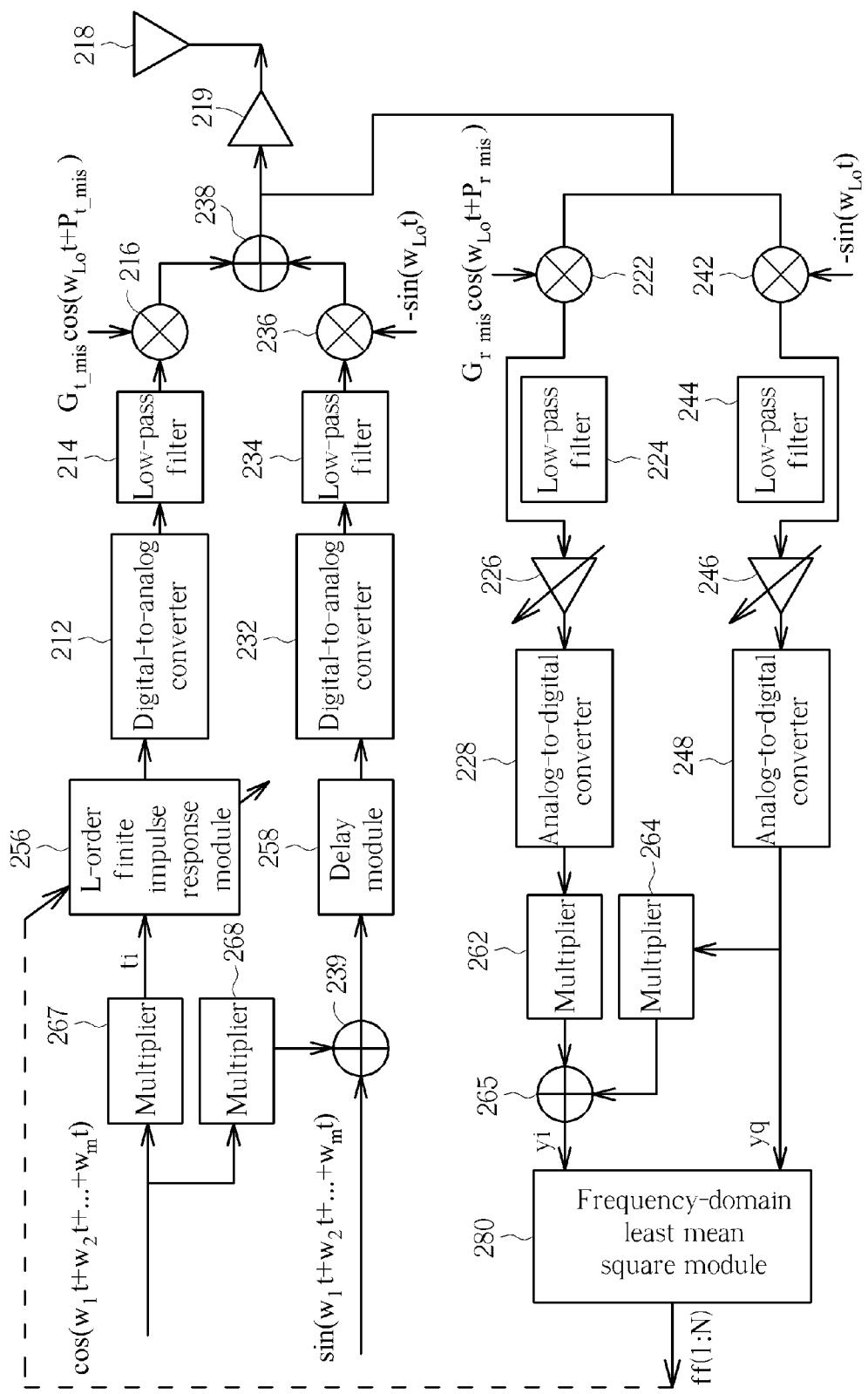
FIG. 13 illustrates a state diagram of the receiver while performing Step 610 and Step 612 shown in FIG. 10.

In Step 612, as shown in FIG. 13, the in-phase portion $G_{mis}*\cos(w_{Lo}*t+P_{t\_mis})$ of the signal of the local oscillator 237, which is omitted in FIG. 13 for clear illustration, is mixed with an in-phase portion $\cos[(w_1+w_2+\ldots+w_m)*t]$ of a multi-tone signal at the multiplier 216, where $w_1, w_2, \ldots, w_m$ indicate different frequencies, and an intermediate signal ti is defined to be corresponding to the in-phase portion $\cos[(w_1+w_2+\ldots+w_m)*t]$ of the multi-tone signal and to be generated at the input terminal of the L-order finite impulse response module 256. Besides, the quadrature portion $-\sin(w_{Lo}*t)$ of the signal of the local oscillator 237 is also mixed with a quadrature portion $\sin[(w_1+w_2+\ldots+w_m)*t]$ of the multi-tone signal and the processed in-phase portion of the multi-tone signal by the multiplier 268, so as to generate an intermediate mixed signal at the output terminal of the adder 238 by adding the outputs of the multiplier 216 and the multiplier 236. After the intermediate mixed signal reaches the receiver 220, it is mixed with the quadrature portion $-\sin(w_o*t)$ of the signal of the local oscillator 227 shown in FIG. 4, which is omitted in FIG. 13 for clear illustration, and is processed by the gain amplifier 246 and the analog-to-digital converter 248 for generating a quadrature time-domain signal yq at an input terminal of the frequency-domain least mean square module 280. Moreover, the intermediate mixed signal is also mixed with the in-phase portion $G_{r\_mis}*\cos(w_{Lo}*t+P_{r\_mis})$ of the signal of the local oscillator 227, the intermediate mixed signal is then processed by the gain amplifier 226, the analog-to-digital converter 228, and the multiplier 262, and the intermediate mixed signal is added via the multiplier 264 to the quadrature time-domain signal yq at the adder 265 at last, for generating an in-phase time-domain signal yi at an input terminal of the frequency-domain least mean square module 280.

Figure 14:
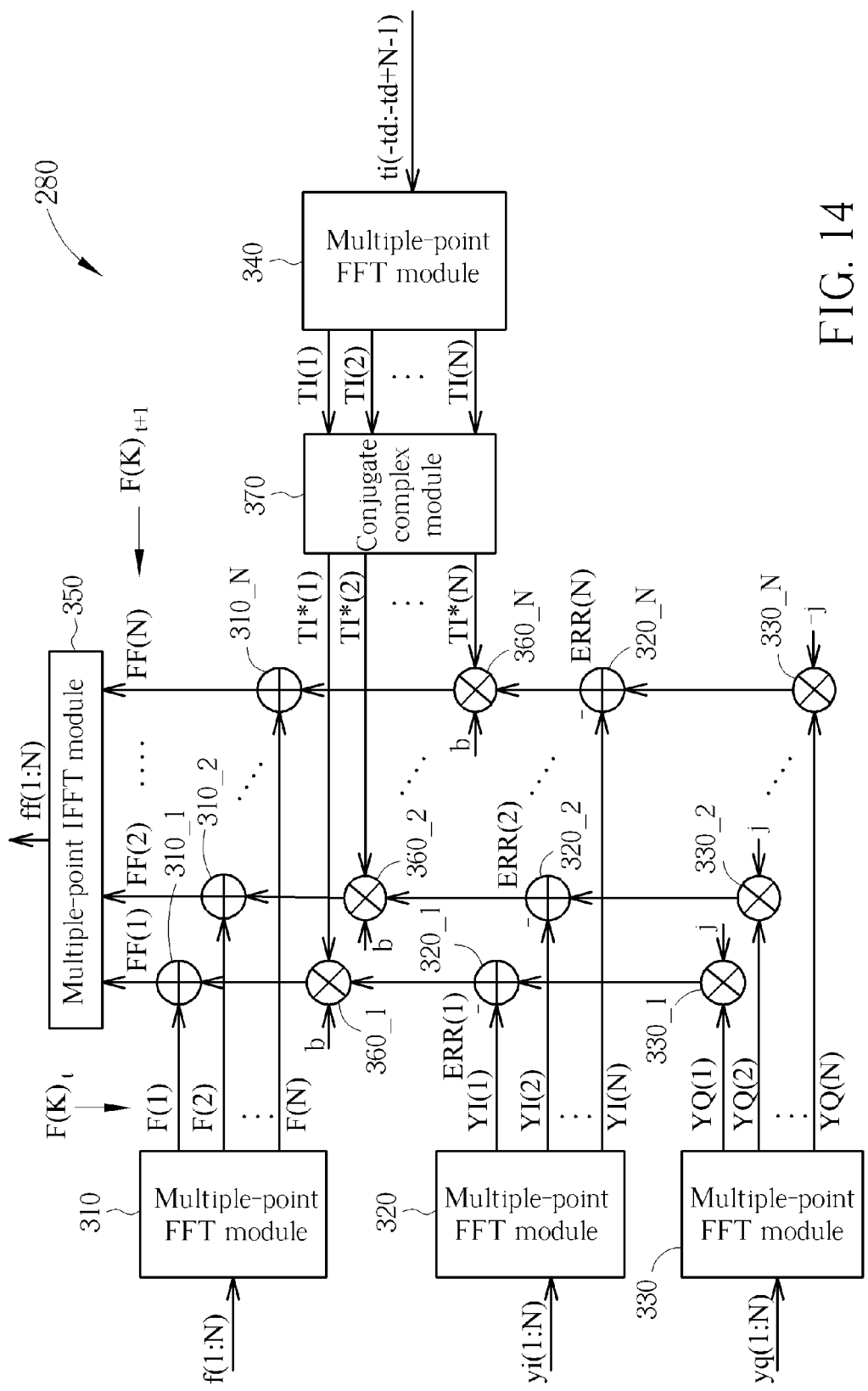
FIG. 14 illustrates a block diagram of utilizing the frequency-domain least mean square module for performing the frequency-domain least mean square algorithm mentioned in Step 612 shown in FIG. 10 according to one embodiment of the present invention.

Please refer to FIG. 14, which illustrates a block diagram of utilizing the frequency-domain least mean square module 280 for performing the frequency-domain least mean square algorithm mentioned in Step 612 according to one embodiment of the present invention. As shown in FIG. 14, the frequency-domain least mean square module 280 utilizes the abovementioned intermediate signal ti at the input terminal of the multi-point FFT module 340 in Step 612, and it indicates a primary difference from Step 512. Note that the operations of the frequency-domain least mean square module 280 for processing time-domain signals are also based on a condition that each of the time-domain signals is sampled by N times.

In FIG. 14, the operations of the frequency-domain least mean square module 280 are explained based on processing a single multi-tone signal. The frequency-domain least mean square module 280 is configured to generate N second L-order finite impulse response coefficients ff(1:N) according to N first L-order finite impulse response coefficients f(1:N) utilized by the L-order finite impulse response module 256, N in-phase time-domain signals yi(1:N), N quadrature time-domain signals yq(1:N), and N intermediate signals ti(−td:−td+N−1). The frequency-domain least mean square module 280 is further configured to return the N second L-order finite impulse response coefficients ff(1:N) to the L-order finite impulse response module 256 for updating, for the purpose of reducing I/Q imbalance occurring in other types of signals to be processed by the L-order finite impulse response module 256. Note that td indicates a time frame in which N intermediate signals ti travel through the transmitter 210 and the receiver 220 till reaching the frequency-domain least mean square module 280. The N in-phase time-domain signals yi(1:N), the N quadrature time-domain signals yq(1:N), and the N intermediate signals ti(−td:−td+N−1) are results of sampling at the transmitter 210 and the receiver 220 by N times.

In the operations shown in FIG. 14, how the error frequency-domain signals ERR(1), ERR(2), . . . , ERR(N) is the same as shown in FIG. 8 so that repeated operations are saved for brevity. The N intermediate signals ti(−td:−td+N−1) are then transformed into N intermediate frequency-domain signals TI(1), TI(2), . . . , TI(N) by the multi-point FFT module 340, and the N intermediate frequency-domain signals TI(1), TI(2), . . . , TI (N) are then processed by the conjugate complex module 370 to generate N intermediate frequency-domain signals TI*(1), TI*(2), . . . , TI*(N).

The N first L-order finite impulse response frequency-domain coefficients F(1), F(2), . . . , F(N) are adjusted to generate N second L-order finite impulse response frequency-domain coefficients FF(1), FF(2), . . . , FF(N) according to the N error frequency-domain signals ERR(1), ERR(2), . . . , ERR(N), the N intermediate frequency-domain signals TI*(1), TI*(2), . . . , TI*(N), and the step value b. The rule of generating the N second L-order finite impulse response frequency-domain coefficients FF(1), FF(2), . . . , FF(N) is listed as the following:

$$F(K)_{t+1}=F(K)_t+b\cdot ERR(K)\cdot TI^*(K) \qquad (4)$$

Variables in Equation (4) are roughly the same as the variable in Equation (3) in definition so that repeated descriptions are saved for brevity.

At last, the multi-point IFFT module 350 is configured to transform the N second L-order finite impulse response frequency-domain coefficients FF(1), FF(2), . . . , FF(N) from the frequency domain to the time domain for generating N second L-order finite impulse response time-domain coefficients ff(1:N). The N second L-order finite impulse response time-domain coefficients ff(1:N) are then returned to the L-order finite impulse response module 256 by the frequency-domain least mean square module 280 for replacing the previously-utilized first L-order finite impulse response time-domain coefficients f(1:N), for the purpose of more efficiently reducing the I/Q imbalance in signals in comparison to the previously-utilized first L-order finite impulse response time-domain coefficients f(1:N).

The present invention discloses a method for compensating in a transmitter and a receiver of a wireless communication system to reduce noises caused by signal imbalance (I/Q imbalance) between a quadrature portion and an in-phase portion of wireless signals, where the signal imbalance is introduced by a local oscillator or mismatch between analog elements of the wireless communication system.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A method of reducing signal imbalance in a transmitter of a wireless communication system, comprising:

inputting a first single-tone signal having a first frequency to the transmitter for generating a first single-tone modulated signal and inputting a second single-tone signal having a second frequency to the transmitter for generating a second single-tone modulated signal, wherein a sum of the first frequency and the second frequency is zero, and the first frequency is higher than the second frequency;

inputting the first single-tone modulated signal to a self-mixer of the transmitter for generating a first mixed signal, and inputting the second single-tone modulated signal to the self-mixer for generating a second mixed signal;

determining a first multiplier coefficient and a second multiplier coefficient corresponding to a first minimal power value of the first mixed signal at a third frequency according to the first minimal power value, and determining a third multiplier coefficient and a fourth multiplier coefficient corresponding to a second minimal power value of the second mixed signal at a fourth frequency according to the second minimal power value, wherein the third frequency is equal to a double of the first frequency, and the fourth frequency is equal to a double of the second frequency;

re-inputting the first single-tone signal to the transmitter, and processing the first single-tone signal at the transmitter using the first multiplier coefficient and the second multiplier coefficient for determining a third minimal power value at a fifth frequency at a receiver of the wireless communication system, and determining a fifth multiplier coefficient and a sixth multiplier coefficient corresponding to the third minimal power value, wherein the fifth frequency is equal to half of the fourth frequency;

the transmitter utilizing a constant multiplier coefficient and a seventh multiplier coefficient, and the receiver utilizing the fifth multiplier coefficient and the sixth multiplier coefficient, wherein the seventh multiplier coefficient is equal to half of a sum of the second multiplier coefficient and the fourth multiplier coefficient; and inputting a multi-tone signal at the transmitter, and performing a frequency-domain least mean square algorithm according to the multi-tone signal, for updating a plurality of first multi-tap finite impulse time-domain coefficients into a plurality of second multi-tap finite impulse time-domain coefficients.

2. The method of claim 1, wherein the second multiplier coefficient is a negative of a tangent of a phase mismatch between a first quadrature portion and a first in-phase portion generated at the transmitter and corresponding to the first single-tone signal, the fourth multiplier coefficient is a negative of a tangent of a phase mismatch between a second quadrature portion and a second in-phase portion generated at the transmitter and corresponding to the second single-tone signal, and the sixth multiplier coefficient is a negative of a tangent of a phase mismatch between a third quadrature portion and a third in-phase portion generated at the receiver and corresponding to the re-inputted first single-tone signal.

3. The method of claim 1, further comprising:

bypassing at least one low-pass filter of the receiver while re-inputting the first single-tone signal to the transmitter or while the transmitter utilizing the constant multiplier coefficient and the seventh multiplier coefficient.

4. The method of claim 1 wherein inputting the multi-tone signal at the transmitter and performing the frequency-domain least mean square algorithm according to the multi-tone signal for updating the plurality of first multi-tap finite impulse time-domain coefficients into the plurality of second multi-tap finite impulse time-domain coefficients comprises:

the transmitter utilizing the constant multiplier coefficient for processing and sampling an in-phase portion of the first multi-tone signal to generate a plurality of first intermediate signals;

the transmitter utilizing the seventh multiplier coefficient for processing and sampling the in-phase portion and the quadrature portion of the multi-tone signal to generate a plurality of second intermediate signals;

the receiver sampling the first intermediate signal and the second intermediate signal to generate a plurality of intermediate in-phase signals and a plurality of quadrature time-domain signals;

the receiver utilizing the fifth multiplier coefficient for processing the intermediate in-phase signal, utilizing the sixth multiplier coefficient for processing the quadrature time-domain signal, and adding and sampling results of the processed intermediate in-phase signal and the quadrature time-domain signal to generate a plurality of in-phase time-domain signals; and performing the frequency-domain least mean square algorithm according to the plurality of first multi-tap finite impulse time-domain coefficients, the plurality of first intermediate signals, the plurality of in-phase time-domain signals, and the plurality of quadrature time-domain signals, for updating the plurality of first multi-tap finite impulse time-domain coefficients into the plurality of second multi-tap finite impulse time-domain coefficients.

5. The method of claim 4, wherein performing the frequency-domain least mean square algorithm according to the plurality of first multi-tap finite impulse time-domain coefficients, the plurality of first intermediate signals, the plurality of in-phase time-domain signals, and the plurality of quadrature time-domain signals for updating the plurality of first multi-tap finite impulse time-domain coefficients into the plurality of second multi-tap finite impulse time-domain coefficients comprises:

performing multi-point FFT on the plurality of first multi-tap finite impulse time-domain coefficients to generate a plurality of first multi-tap finite impulse frequency-domain coefficients;

performing the multi-point FFT on the plurality of first intermediate signals to generate a plurality of first intermediate frequency-domain signals;

performing the multi-point FFT on the plurality of in-phase time-domain signals to generate a plurality of in-phase frequency-domain signals;

performing the multi-point FFT on the plurality of quadrature time-domain signals to generate a plurality of quadrature frequency-domain signals;

generating a plurality of error frequency-domain signals according to the plurality of quadrature frequency-domain signals and the plurality of in-phase frequency-domain signals;

generating a plurality of second multi-tap finite impulse frequency-domain coefficients according to the plurality of first multi-tap finite impulse frequency coefficients, a step value, the plurality of error frequency-domain signals, and the plurality of first intermediate frequency-domain signals; and performing IFFT on the plurality of second multi-tap finite impulse frequency-domain coefficients to generate the plurality of second multi-tap finite impulse time-domain coefficients.

6. The method of claim 5, wherein generating the plurality of error frequency-domain signals according to the plurality of quadrature frequency-domain signals and the plurality of in-phase frequency-domain signals comprises:

generating the plurality of error frequency-domain signals according to $ERR(K)=YQ(K) \cdot j - YI(k), 0 \leq K < N/2$ and $ERR(K)=YQ(K) \cdot (-j) - YI(k), N/2+1 \leq K < N-1$;

wherein a number for each of the plurality of quadrature frequency-domain signals, the plurality of in-phase frequency-domain signals, or the plurality of error frequency-domain signals is a positive integer N, the variable K indicates an integer ranging from 1 t N, ERR(K) indicates one of the plurality of error frequency-domain signals, YQ(K) indicates one of the plurality of quadrature frequency-domain signals, and YI(K) indicates one of the plurality of in-phase frequency-domain signals.

7. The method of claim 5, wherein generating the plurality of second multi-tap finite impulse frequency-domain coefficients according to the plurality of first multi-tap finite impulse frequency coefficients, the step value, the plurality of error frequency-domain signals, and the plurality of first intermediate frequency-domain signals comprises:

generating the plurality of second multi-tap finite impulse frequency-domain coefficients according to $F(K)_{t+1}=F(K)_t+b \cdot ERR(K) \cdot TI^*(K)$;

wherein a number for each of the plurality of first multi-tap finite impulse frequency-domain coefficients, the plurality of error frequency-domain signals, the plurality of first intermediate frequency-domain signals, and the plurality of second multi-tap finite impulse frequency-domain coefficients is a positive integer N, the variable K is a positive integer ranging from 1 to N, ERR(K) indicates one of the plurality of error frequency-domain signals, TI*(K) indicates a conjugate complex of one of the plurality of first intermediate frequency-domain signals, b indicates the step value, $F(K)_t$ indicates one of the plurality of first multi-tap finite impulse frequency-domain coefficients, and $F(K)_{t+1}$ indicates one of the plurality of second multi-tap finite impulse frequency-domain coefficients.

* * * * *